(12) United States Patent
Weisel et al.

(10) Patent No.: US 8,573,904 B2
(45) Date of Patent: Nov. 5, 2013

(54) GROOVING INSERT

(75) Inventors: Michael Anthony Weisel, Latrobe, PA (US); Neal Stuart Myers, Greensburg, PA (US); Karen Anne Craig, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 246 days.

(21) Appl. No.: 13/160,049

(22) Filed: Jun. 14, 2011

(65) Prior Publication Data

US 2012/0321400 A1  Dec. 20, 2012

(51) Int. Cl.
*B32B 27/16* (2006.01)
(52) U.S. Cl.
USPC .......................... 407/113; 407/115; 407/117
(58) Field of Classification Search
CPC ........................................................ B23B 27/16
USPC ................. 407/113–117, 100, 61, 42, 18, 19; 82/1.2–1.5
See application file for complete search history.

(56) References Cited

U.S. PATENT DOCUMENTS

| | | | |
|---|---|---|---|
| 275,760 A * | 4/1883 | Cochran | 223/30 |
| 2,038,611 A | 4/1936 | Simonson | |
| 2,247,284 A | 6/1941 | Young | |
| 2,333,935 A | 11/1943 | Jones | |
| 2,365,549 A | 12/1944 | Haynes | |
| 2,545,443 A | 3/1951 | Bowren | |
| 2,848,912 A | 8/1958 | Kalat | |
| 2,869,404 A | 1/1959 | Condrac | |
| 3,195,378 A | 7/1965 | Cogsdill | |
| 3,208,312 A | 9/1965 | Heuser | |
| 3,228,265 A | 1/1966 | Stoddard et al. | |
| 3,299,749 A | 1/1967 | Koppelmann | |
| 3,625,625 A | 12/1971 | Hull et al. | |
| 4,067,251 A | 1/1978 | Eckle et al. | |
| 4,220,429 A | 9/1980 | Powers et al. | |
| 4,409,868 A | 10/1983 | Huddle et al. | |
| 4,527,449 A | 7/1985 | Sydlowski et al. | |
| 4,564,321 A | 1/1986 | Kondo et al. | |
| 4,606,680 A | 8/1986 | Striegl | |
| 4,612,831 A | 9/1986 | Lehmkuhl | |
| 4,674,923 A | 6/1987 | Ogilvie et al. | |
| 4,784,537 A | 11/1988 | Baker | |
| 4,841,636 A | 6/1989 | Huggins | |
| 5,085,541 A * | 2/1992 | Simpson, III | 407/110 |
| 5,095,785 A | 3/1992 | Noggle | |

(Continued)

FOREIGN PATENT DOCUMENTS

DE           40 22 579 A1    1/1991
DE       102007060500 A1    6/2009

(Continued)

*Primary Examiner* — Daniel Howell
*Assistant Examiner* — Ryan Rufo
(74) *Attorney, Agent, or Firm* — Larry R. Meenan, Esq.

(57) ABSTRACT

A cutting insert having a base portion structured to be coupled to a tool body, the base portion having a leading end, a trailing end, and a mounting face extending therebetween. A number of cutting portions extend from the base portion opposite the mounting face. Each cutting portion of the number of cutting portions includes a cutting face disposed adjacent the leading end of the base. The cutting face having an angled portion disposed at a first angle with respect to a reference plane oriented parallel to the leading end and perpendicular to the mounting face. The cutting face also having a curved portion disposed between the angled portion and the base portion.

18 Claims, 4 Drawing Sheets

(56) References Cited

U.S. PATENT DOCUMENTS

| | | | |
|---|---|---|---|
| 5,120,167 A | 6/1992 | Simpson | |
| 5,183,089 A * | 2/1993 | Norlander et al. | 144/231 |
| 5,308,197 A * | 5/1994 | Little | 407/101 |
| 5,392,674 A * | 2/1995 | Mihic | 82/158 |
| 5,505,569 A | 4/1996 | Gustafsson et al. | |
| 5,947,649 A | 9/1999 | Arai et al. | |
| 6,331,093 B1 | 12/2001 | Graham et al. | |
| 6,655,883 B2 | 12/2003 | Maar | |
| 6,719,501 B2 | 4/2004 | Sekiguchi et al. | |
| 6,733,212 B2 | 5/2004 | Nagaya et al. | |
| 6,846,136 B2 | 1/2005 | Brock et al. | |
| 6,857,344 B1 | 2/2005 | Diller | |
| 7,089,837 B2 | 8/2006 | Feil et al. | |
| 7,393,160 B2 * | 7/2008 | Volokh | 407/54 |
| 7,445,409 B2 | 11/2008 | Trice et al. | |
| 7,510,353 B2 | 3/2009 | Kramer | |
| 7,607,868 B2 | 10/2009 | Noggle | |
| 7,699,567 B2 | 4/2010 | Nedzlek | |
| 2005/0150336 A1 | 7/2005 | Cambrey | |
| 2008/0170921 A1 | 7/2008 | Sjoo | |
| 2009/0290943 A1 | 11/2009 | Noggle | |
| 2011/0303057 A1 * | 12/2011 | Craig et al. | 82/1.2 |
| 2011/0303058 A1 | 12/2011 | Craig et al. | |

FOREIGN PATENT DOCUMENTS

| | | |
|---|---|---|
| EP | 0187647 A3 | 12/1987 |
| EP | 0291933 | 11/1988 |
| EP | 1123765 | 8/2001 |
| FR | 1234204 A | 10/1960 |
| GB | 2481311 | 12/2011 |
| GB | 2481312 A | 12/2011 |
| JP | 52003792 A | 1/1977 |
| JP | 7 266121 A | 10/1995 |
| JP | 08071811 | 3/1996 |
| JP | 2003205407 A | 7/2003 |
| WO | WO-9614181 | 5/1998 |

* cited by examiner

GROOVING INSERT

BACKGROUND

1. Field of the Invention

The invention relates generally to machine tools for cutting grooves in a hole previously formed in a workpiece and, more particularly, to an insert for use in machining grooves within a bore.

2. Background Information

It is often necessary or desirable to create an internal recess or groove within a tube or hole of a machine part. Such grooving process is typically carried out in one of two ways. One solution is to use a grooving tool attached to a tool holder on a single axis rotary drive. The end of the grooving tool that is placed in the hole has one or more cutting inserts. These cutting inserts are often radially extendable and retractable. Such feature allows the tool to be inserted into a hole, then rotated and extended radially to form the groove along the inside surface of the hole.

Examples of such extendable inserts are well known in the prior art. U.S. Pat. No. 2,333,935 and U.S. Pat. No. 2,545,443 each shows extendable inserts for internal grooving. Generally, a central rod is moved in an axial direction and has a tapered surface at its end. The tapered surface engages one or more cutting inserts in a wedging action to convert the axial force into a radial force moving the insert into cutting position. The means for moving the central rod is often mechanical, but electrical or hydraulic movement of such a rod is not new to the art. Regardless of the means for effecting movement, an elaborate control system is generally required to control the movement of the central rod. This control is necessary because the position of the central rod determines the diameter of a cut that will be made in the wall of the workpiece.

Another solution, such as described in commonly assigned U.S. patent application Ser. No. 13/159,901, utilizes a solid bodied cutting tool body having a number of pockets in which cutting inserts having a desired cutting profiled are installed. In order to carry out grooving operations on the wall of a bore of a workpiece, tool body is both rotated about a central axis while simultaneously interpolated along a generally circular path about the central axis of the bore.

Regardless of the solution, each utilizes one or more replaceable cutting inserts of a selected profile. Ideally, such cutting inserts are durable, capable of forming the desired grooves in a timely manner, and capable of forming grooves of a desired quality. Although known cutting inserts have been generally suitable for such operations, there exists a need for improved cutting inserts for use in such groove cutting operations.

SUMMARY OF THE INVENTION

Shortcomings of the prior art are addressed by embodiments of the invention. As a first aspect, a cutting insert is provided. The cutting insert comprises a base portion structured to be coupled to a tool body. The base portion having a leading end, a trailing end, and a mounting face extending therebetween. The cutting insert further comprises a number of cutting portions extending from the base portion opposite the mounting face, each cutting portion of the number of cutting portions having a cutting face disposed generally facing the leading end of the base. The cutting face comprises an angled portion disposed at a first angle with respect to a reference plane parallel to the leading end and perpendicular to the mounting face and a curved portion disposed between the angled portion and the base portion.

The first angle may be about 4 degrees. The curved portion may be disposed about a radius of about 0.64 millimeters.

Each cutting portion of the number of cutting portions may further include a trailing face comprising an upper portion disposed at a first clearance angle with respect to the mounting face and a lower portion disposed between the upper portion and the base portion, the lower portion being disposed at a second clearance angle with respect to the mounting face. The first clearance angle may be about 14 degrees and the second clearance angle may be about 33 degrees.

Each cutting portion of the number of cutting portions may further comprise a trailing face and a pair of lateral faces extending from the cutting face to the trailing face and tapering inward at a taper angle oblique to a reference plane disposed perpendicular to the leading end of the base portion and normal to the mounting face. The taper angle may be about 4 degrees.

Each cutting portion of the number of cutting portions may further comprise a trailing face and a pair of lateral faces extending up from the base portion along the cutting face to the trailing face and flaring outward at a flare angle oblique to the mounting face. The flare angle may be in the range of about 2 degrees to about 4 degrees.

As another aspect, a grooving insert for forming grooves in the wall of a bore formed in a workpiece is provided. The cutting insert comprises a base portion structured to be coupled to a tool body, the base portion having a leading end, a trailing end, and a mounting face extending therebetween. The cutting insert further comprises a number of cutting portions extending from the base portion opposite the mounting face. Each cutting portion of the number of cutting portions comprises a cutting face and a trailing face. The trailing face comprising an upper portion disposed at a first clearance angle with respect to the mounting face and a lower portion disposed between the upper portion and the base portion. The lower portion is disposed at a second clearance angle with respect to the mounting face.

The first clearance angle may be about 14 degrees and the second clearance angle may be about 33 degrees.

The cutting face may comprise an angled portion disposed at a first angle with respect to a reference plane parallel to the leading end and perpendicular to the mounting face and a curved portion disposed between the angled portion and the base portion. The first angle may be about 4 degrees. The curved portion may be disposed about a radius of about 0.64 millimeters.

Each cutting portion of the number of cutting portions may further comprise a pair of lateral faces extending from the cutting face to the trailing face and tapering inward at a taper angle oblique to a reference plane disposed perpendicular to the leading end of the base portion and normal to the mounting face. The taper angle may be about 4 degrees.

Each cutting portion of the number of cutting portions may further comprise a pair of lateral faces extending up from the base portion along the cutting face to the trailing face and flaring outward at a flare angle oblique to the mounting face. The flare angle may be in the range of about 2 degrees to about 4 degrees.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
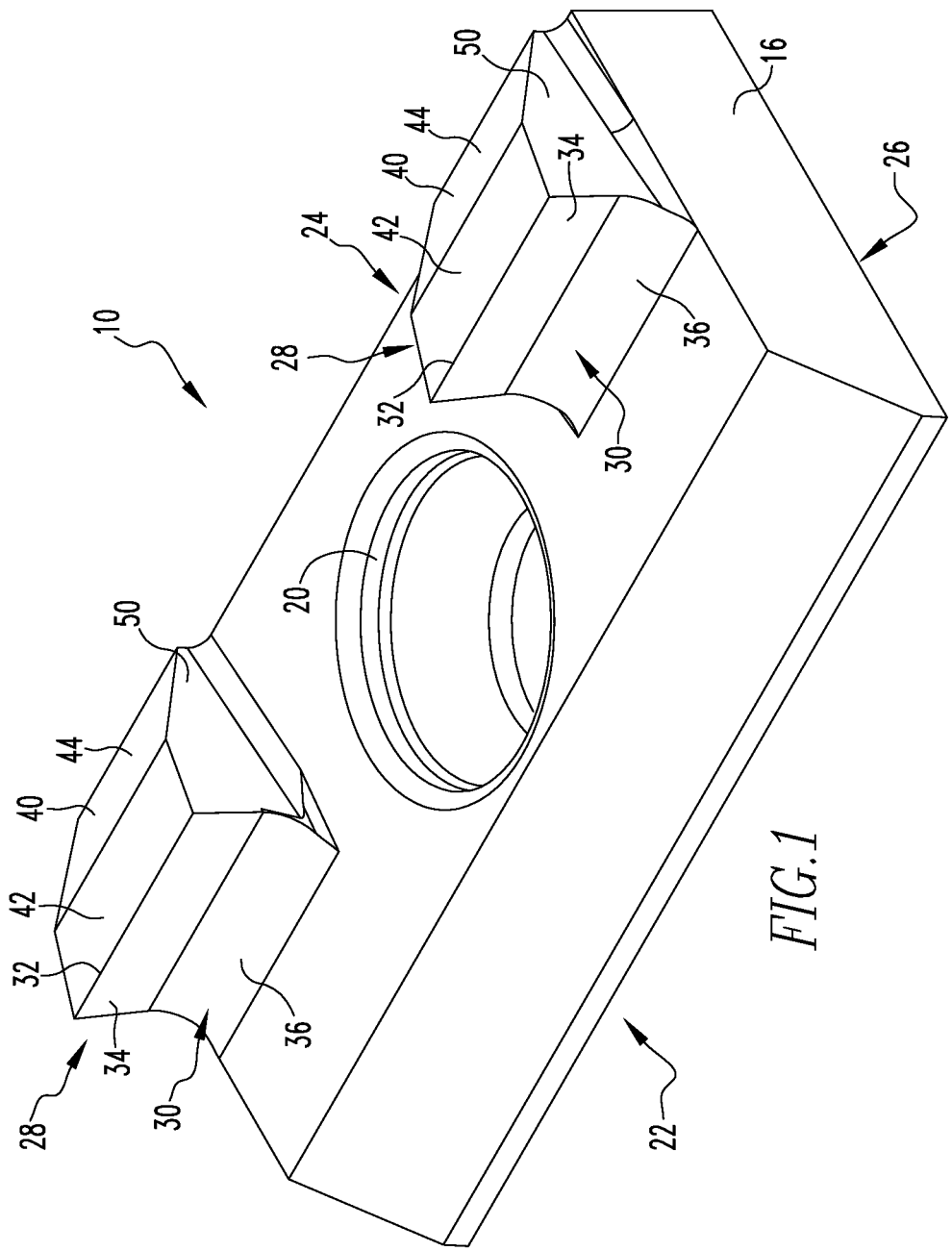
FIG. 1 is an isometric view of a cutting insert in accordance with an example embodiment of the present invention.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

As used herein, the term "number" shall be used to refer to any non-zero quantity (i.e., one or any quantity greater than one).

As used herein, the term "about" shall be used to refer to a point near, or at, a particular identified point (i.e., proximate).

Figure 2:
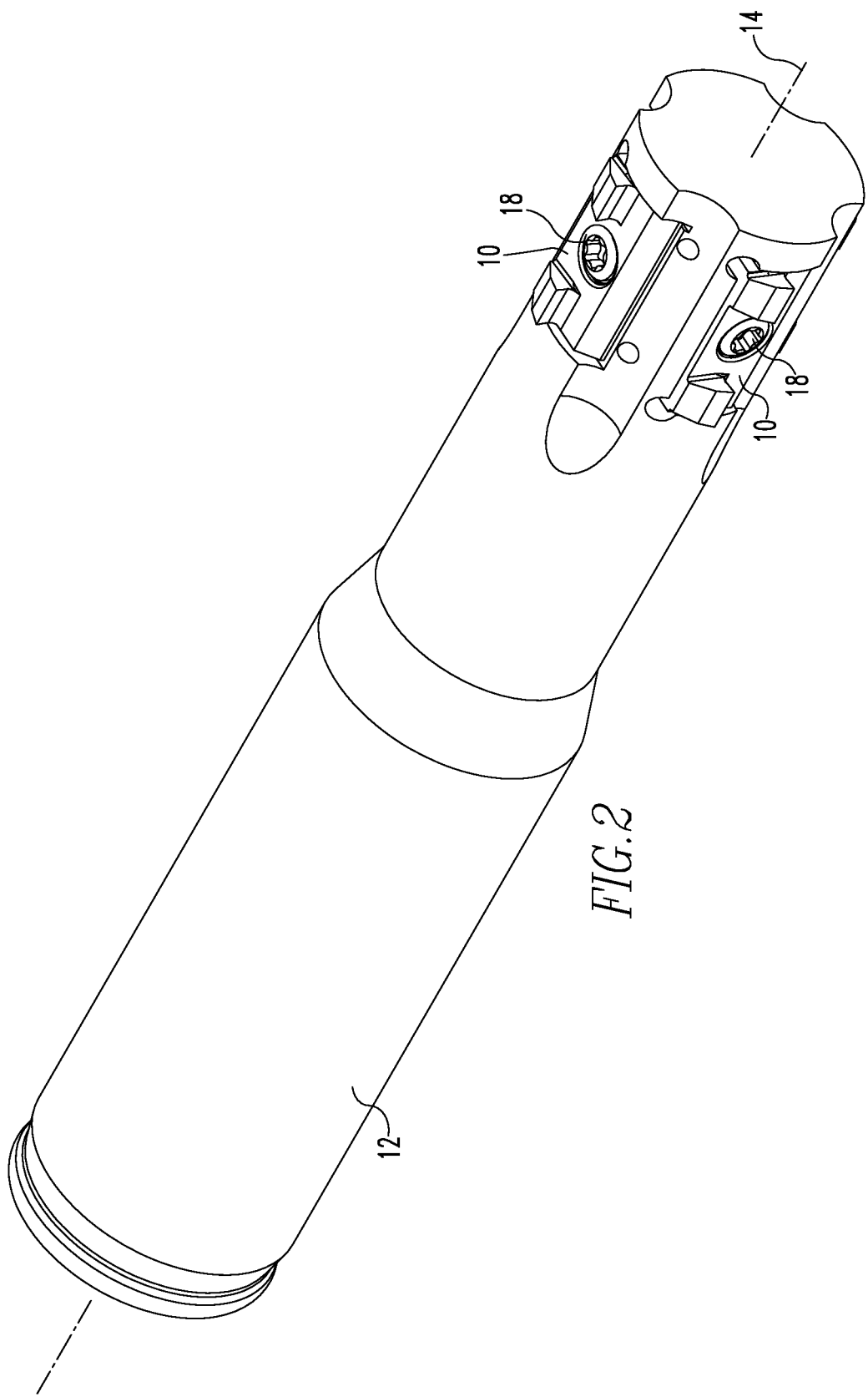
FIG. 2 is an isometric view of the insert of FIG. 1 installed on a tool body in accordance with an example embodiment of the present invention.

FIG. 1 depicts an example cutting insert 10, in accordance with a non-limiting embodiment of the present invention, for use with a tool body 12, such as shown in FIG. 2, in conducting cutting/grooving operations on an interior wall of a bore formed in a workpiece (not shown) when the tool body 12 is rotated about a central longitudinal axis 14. Cutting insert 10 may be used with cutting tool bodies having either fixed pockets, such as shown in FIG. 2, or radially moveable pockets (not shown).

Cutting insert 10 is preferably formed from carbide or other suitable material via an injection molded process. It is to be appreciated, however, that other materials and or forming processes could be used without varying from the scope of the present invention. Continuing to refer to FIG. 1, cutting insert 10 includes a base portion 16 structured to be coupled to a tool body, such as tool body 12 of FIG. 2. In the example embodiment depicted, such coupling is achieved through the interaction of a mounting screw 18 with a generally central mounting hole 20 in base portion 16. It is to be appreciated, however, that other suitable coupling means may be employed without varying from the scope of the present invention. Base portion 16 includes a leading end 22, a trailing end 24, and a mounting face 26 (only the edge is shown ion FIG. 1) extending therebetween.

Cutting insert 10 further includes a number (two in the illustrated embodiment) of cutting portions 28 which extend upward from the base portion 16 opposite the mounting face 26. Each cutting portion includes a cutting face 30 generally facing the leading end 22 of the base portion 16 and adjacent a cutting edge 32.

Figure 3:
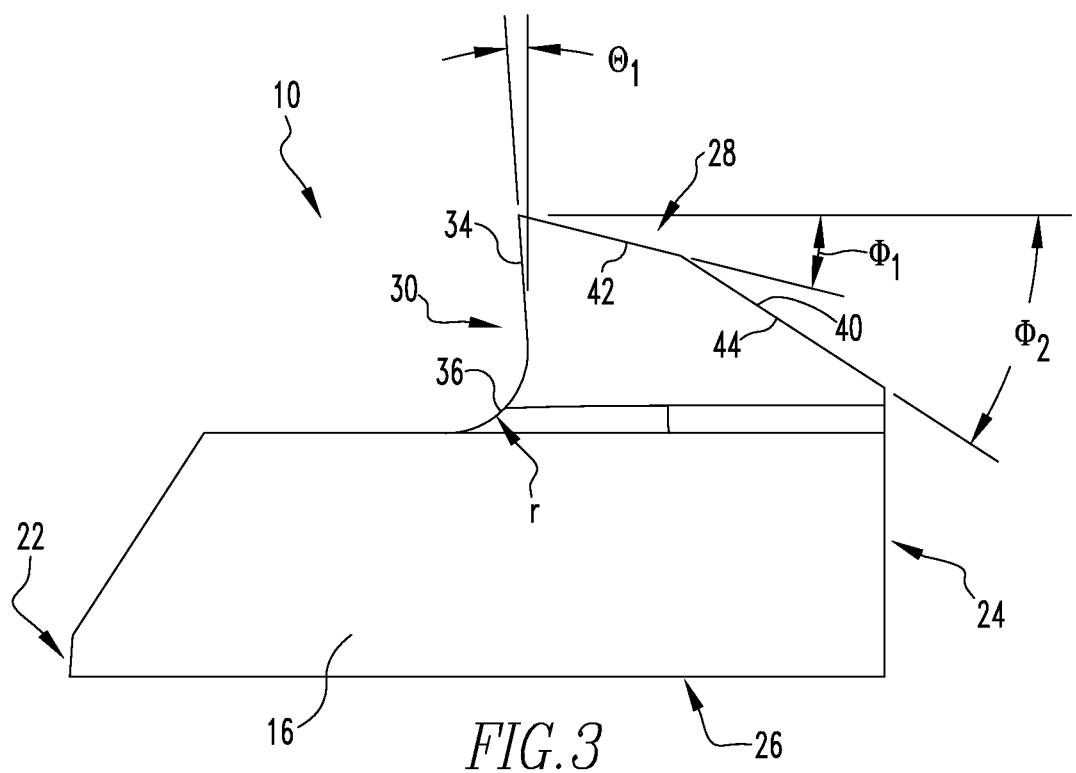
FIG. 3 is a side elevational view of the cutting insert of FIG. 1.

Referring to FIG. 3, each cutting face 30 includes a generally planar, angled portion 34 disposed at a first angle $\theta_1$ with respect to a reference plane (not shown) oriented parallel to the leading end 22 of the base portion 16 and normal to the mounting face 26 of the base portion 16. Preferably, $\theta_1$ is about 4 degrees (±30'). Continuing to refer to FIG. 3, cutting face 30 further includes a curved portion 36 disposed between the angled portion 34 and the base portion 16. Preferably, curved portion 36 is disposed about a radius r of about 0.64 millimeters. Such positioning of the angled portion 34 and curved portion 36 help to curl and break the chips formed during cutting operations in a desirable manner.

As shown in FIGS. 1 and 3, each cutting portion 28 also includes a trailing face 40 having an upper portion 42 and a lower portion 44 disposed between the upper portion 42 and the base portion 16. Upper portion 42 is generally disposed at a first clearance angle $\phi_1$ with respect to a reference plane (not shown) parallel to the mounting face 26. Lower portion 44 is generally disposed a second clearance angle $\phi_2$ with respect to a reference plane (not shown) parallel to the mounting face 26. In a preferred example of the present invention, the first clearance angle $\phi_1$ is about 14 degrees (±1 degree) and the second clearance angle $\phi_2$ is about 33 degrees (±1 degree). Similar to the orientations of the portions of the cutting face 30, such clearance angles $\phi_1$, $\phi_2$ help to provide clearance in the groove being cut. Such clearance helps to prevent rubbing and thus provides for an improved surface finish.

Figure 4:
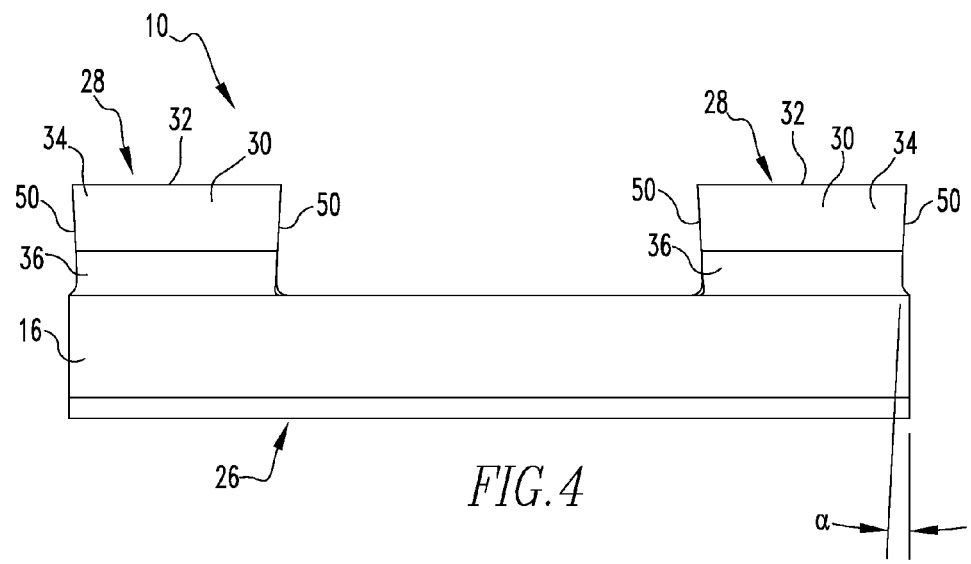
FIG. 4 is a front elevational view of the cutting insert of FIG. 1.
Figure 5:
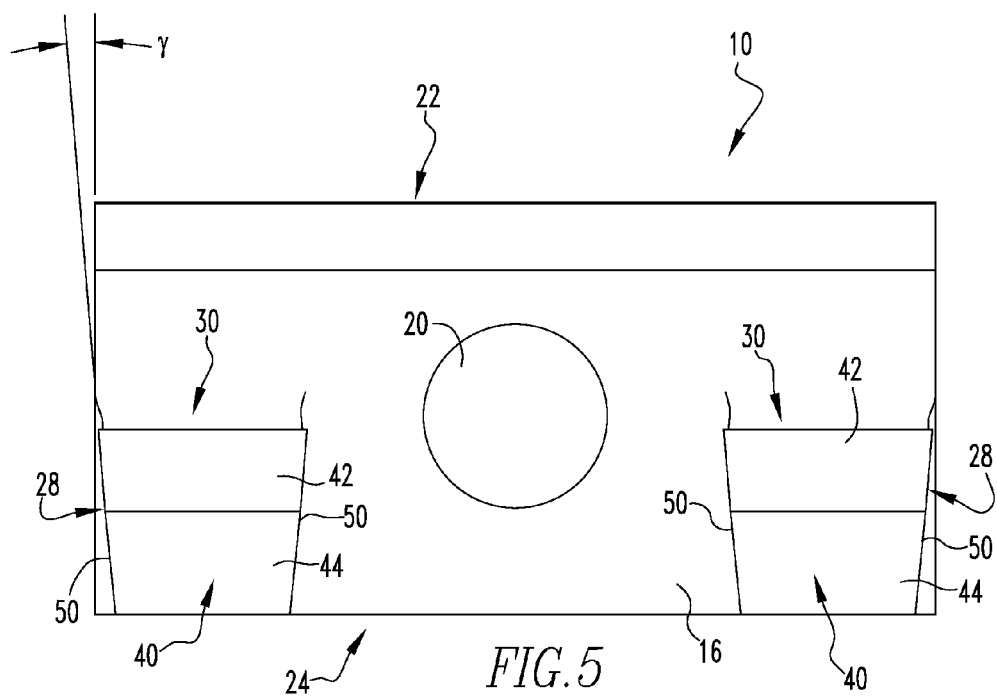
FIG. 5 is a top plan view of the cutting insert of FIG. 1.

Referring to FIGS. 1, 4 and 5, each cutting portion 28 further includes a pair of lateral faces 50 which generally extend from the cutting face 30 to the trailing face 40 and taper inward (when moving from front to back) at a taper angle $\gamma$ (FIG. 5) oblique to a reference plane (not shown) disposed generally perpendicular to the leading end 22 of the base portion 16 and perpendicular to the mounting face 26. In a preferred example of the present invention, the taper angle $\gamma$ is about 4 degrees, or more particularly, 4°41'±30'. As shown in FIG. 5, when viewed from the front of cutting insert 10, each lateral face 50 may flare outward at a flare angle $\alpha$ oblique to the mounting face 26. In a preferred example of the present invention, the flare angle $\alpha$ is in the range of about 2 degrees to about 4 degrees. It is to be appreciated that the use of such taper and flare angles $\gamma$, $\alpha$ generally provides improved clearance in a groove formed by the cutting insert which generally results in improved surface finish on the machined part and improved service life for the cutting insert.

While specific embodiments of the invention have been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A cutting insert comprising:
    a base portion structured to be coupled to a tool body, the base portion having a leading end, a trailing end, and a mounting face extending therebetween, the mounting face positioned to face the tool body when the base portion is coupled to the tool body; and
    a number of cutting portions extending from the base portion opposite the mounting face, each cutting portion of the number of cutting portions having a cutting face disposed generally facing the leading end of the base, the cutting face comprising:
        an angled portion disposed at a first angle with respect to a reference plane parallel to the leading end and perpendicular to the mounting face; and
        a curved portion disposed between the angled portion and the base portion.

2. The cutting insert of claim 1 wherein the first angle is about 4 degrees.

3. The cutting insert of claim 2 wherein the curved portion is disposed about a radius of about 0.64 millimeters.

4. The cutting insert of claim 1 wherein each cutting portion of the number of cutting portions further includes a trailing face comprising:

an upper portion disposed at a first clearance angle with respect to the mounting face; and a lower portion disposed between the upper portion and the base portion, the lower portion being disposed at a second clearance angle with respect to the mounting face.

5. The cutting insert of claim 4 wherein the first clearance angle is about 14 degrees and the second clearance angle is about 33 degrees.

6. The cutting insert of claim 1 wherein each cutting portion of the number of cutting portions further comprises:
a trailing face; and
a pair of lateral faces extending from the cutting face to the trailing face and tapering inward at a taper angle oblique to a reference plane disposed perpendicular to the leading end of the base portion and normal to the mounting face.

7. The cutting insert of claim 6 wherein the taper angle is about 4 degrees.

8. The cutting insert of claim 1 wherein each cutting portion of the number of cutting portions further comprises:
a trailing face; and
a pair of lateral faces extending up from the base portion along the cutting face to the trailing face and flaring outward at a flare angle oblique to the mounting face.

9. The cutting insert of claim 8 wherein the flare angle is in the range of about 2 degrees to about 4 degrees.

10. A grooving insert for forming grooves in the wall of a bore formed in a workpiece, the cutting insert comprising:
a base portion structured to be coupled to a tool body, the base portion having a leading end, a trailing end, and a mounting face extending therebetween, the mounting face positioned to face the tool body when the base portion is coupled to the tool body; and
a number of cutting portions extending from the base portion opposite the mounting face, each cutting portion of the number of cutting portions comprising:
a cutting face; and
a trailing face comprising:
an upper portion disposed at a first clearance angle with respect to the mounting face; and
a lower portion disposed between the upper portion and the base portion, the lower portion being disposed at a second clearance angle with respect to the mounting face.

11. The grooving insert of claim 10 wherein the first clearance angle is about 14 degrees and the second clearance angle is about 33 degrees.

12. The grooving insert of claim 10 wherein the cutting face comprises:
an angled portion disposed at a first angle with respect to a reference plane parallel to the leading end and perpendicular to the mounting face; and
a curved portion disposed between the angled portion and the base portion.

13. The grooving insert of claim 12 wherein the first angle is about 4 degrees.

14. The grooving insert of claim 13 wherein the curved portion is disposed about a radius of about 0.64 millimeters.

15. The grooving insert of claim 10 wherein each cutting portion of the number of cutting portions further comprises:
a pair of lateral faces extending from the cutting face to the trailing face and tapering inward at a taper angle oblique to a reference plane disposed perpendicular to the leading end of the base portion and normal to the mounting face.

16. The grooving insert of claim 15 wherein the taper angle is about 4 degrees.

17. The grooving insert of claim 10 wherein each cutting portion of the number of cutting portions further comprises:
a pair of lateral faces extending up from the base portion along the cutting face to the trailing face and flaring outward at a flare angle oblique to the mounting face.

18. The grooving insert of claim 17 wherein the flare angle is in the range of about 2 degrees to about 4 degrees.

\* \* \* \* \*